CLASSIFICATION
9353 X
DIVISION.
9353 X
Thos. Fitch & William Kipp
Improvement in Locks & Other Locks.
2-5-1836
Patented Feb 6th 1836
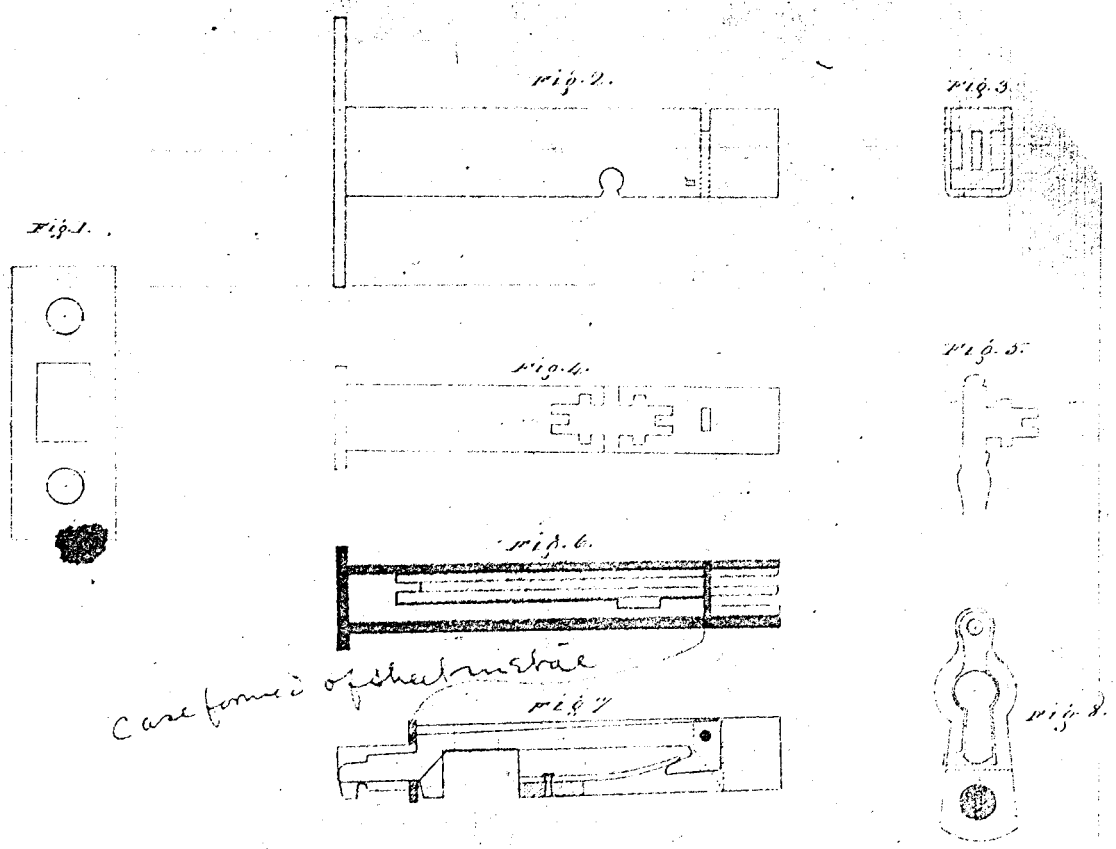

9353X Feb 16, 1836 Feb 5, 1836 425

Philos Blake & Eli Whitney Blake, New Haven Conn.

Letters Patent

The schedule referred to in these Letters Patent and making part of the same
containing a description in the words of the said Philos Blake & Eli Whit
[illegible] of all to whom [illegible] Philos Blake and Eli
ney Blake both of New Haven in the County of New Haven in the State of
Connecticut citizens of said State & of the United States have invented and
constructed several new and useful improvements in mortise and other locks
consisting in certain modifications of the structure of locks as heretofore made
whereby the manufacture is facilitated and the expense diminished & whereby
the mortise lock may be reduced to such a compass that it may be put with-
out injury into doors too thin to receive the mortise locks heretofore in use. The
following is a full and accurate description of a mortise lock as modified by the
introduction of our improvements to wit,
The Case or part which contains or encloses the moving parts of the lock, a single
piece of sheet iron or other metal whose length is equal to the distance that the
lock is to reach in from the edge of the door and whose width is equal to the united
widths of the two sides and one edge of the case being bent twice at right angles
forms the two sides & bottom of the case. One end of this piece thus formed
is secured by soldering, rivetting, brazing, or otherwise, to the edge plate or
plate through which the bolt protrudes when thrown out. [illegible]
the key hole or that part which receives the end of the key is made thro' the the sides
close to the bottom of the case and a slit is cut across the bottom of the case from one
[illegible] holes to the other to allow of the passage of the bit of the key which bit when the
key is introduced passes chiefly or wholly below the bottom of the case. To permit
the key to revolve on its axis and to bring its bit within the case to act on
the moving parts of the lock the bottom of the case is still further cut away this
cutting may be in a form corresponding in whole or in part to the form of
the key thus constituting wards to the lock
The Bolt This has a square head & thin shank as in the common locks
The form and position of the shank may be varied to make variety in the locks
& to suit the method that may be chosen to guide its motion and thrust of 126 93538

[illegible] a notch in the edge of the shank for the key to fall into to throw the bolt
[illegible] may be cut in the bit of the key corresponding in size & posi-
tion to the size & position of the shank so that the extremity of the bit may
[illegible] the lower edge of the shank and fall into a notch or between two [illegible]
or projections on its side. If the shank be located in the centre a single [illegible]
or tooth in the bit for this purpose will be sufficient & in this case the bolt
shank will in some degree subserve the purpose of a middle ward. The tumblers
[illegible] have one to each lock or several at pleasure. Instead of hanging the
tumblers to the case as in the common locks we prefer to hang them to the bolt
so that they may move back and forth with it; & instead of having a projection
on the tumbler to [illegible] into corresponding notches on the bolt to hold the bolt
out when turned out, & in, when thrown in as in the common locks, we
have notches in the lower edges of the tumblers which perform this office by
catching on the edge of a transverse partition in the case. This partition
may extend nearly from bottom to top of the case and have mortices [illegible]
it to guide the ends of the tumblers and of the bolt shank in their movements
(in which case the tumblers will catch on the ends of these mortices) or the
partition may extend only one third or one half the way up & these movements
may be guided in various obvious methods. There may also be notches in
the other edge of the tumblers to catch on the other end of the mortices in the
partition and prevent the bolt from moving when the tumblers are raised
too high by false keys or otherwise or if the partition do not extend above
the tumblers these notches may catch on a cross bar extending across the
case from side to side above the tumblers. The relative position of the tum-
blers and shank of the bolt may be varied to [illegible] variety to the locks &
[illegible] variety may be still further multiplied by having notches of different
depths in the bits of the keys for the tumblers to fall into & by varying the relative
[illegible] of the tumblers & bolt shank in the different arrangements, [illegible]
arrangement [illegible] which will of itself afford a sufficient variety for
all ordinary purposes & perhaps [illegible] at the least [illegible] expense & [illegible]
[illegible] we prefer to all others is to place the tumbler (if one only or one of them
if two) in the centre so that it may fall into the same notch of the key whether
the latter be introduced from one side or the other of the [illegible] [illegible] taking care

9353X place and in some degree [illegible] the purpose of a [illegible] or bridge [illegible] to the lock. In this case a great variety will be produced [illegible] of being opened with each others keys without exceeding two tumblers by varying the depths of one or the other or both of the notches in the key into which they respectively fall.

The Tumbler Springs one spring may act on several tumblers or which we prefer each tumbler may have its appropriate spring. The springs may be secured in various ways either to the case bolt or tumbler. When the tumblers are attached to the bolt we prefer to attach their springs to the bolt also by riveting them to an arm projecting from one side of it [illegible] [illegible] or cap. In describing the case above we omitted to describe a piece or cap to cover its upper edge [illegible] [illegible] We did so purposely because we consider the lock complete without it. It adds nothing either to the [illegible] security utility or durability of the lock and may therefore be dispensed with when economy is an object. If however as an article of merchandize it should be deemed more saleable with a cap this may be added in various ways. A cheap and good method would be to [illegible] the [illegible] of the [illegible] the upper edge [illegible] in a thin piece of sheet iron or other metal [illegible] its end turned down to cover the end of the case. The Key. This does not necessarily differ in any respect from the keys heretofore in use except in the form of the bit as already described which must of course conform to the peculiar construction arrangement and position of the internal machinery of the lock. The Catch Part. This does not necessarily differ from the corresponding part of a common [illegible] lock. The key hole Escutcheons & Drops. The key hole escutcheons differ from those heretofore in use in being [illegible] off from the door by projecting backwards so as to leave room behind them for the Drop. And the drop is hung behind it either on a pin projecting backward from the escutcheon or on one of the screws or escutcheon [illegible] by which it is bound to the door. By means of this construction the Drop may be made with [illegible] of thin sheet iron or brass which would be altogether insufficient if hung as usual on the outside of the Escutcheon. The Drop should have a small arm or point reaching beyond the edge of the Escutcheon either at the top or one side near the bottom by means of which it may be withdrawn from the key hole when 428. 9353X the key is introduced. The Mortise lock thus above described is new or is by
us believed to be new in the following particulars which we deem important as
mainly contributing to the compactness of its form & the facility of its construc
tion & which severally and collectively & whether combined in whole or in part
we claim as our invention viz 1 in combining a case whose two sides &
lower edge are of one piece with the mode as herein described of hanging the
tumblers viz by attaching them to the bolt. Note the upper edge of the case or that
is that toward which the bit of the key is turned when it acts on the bolt & the
other edge is the lower edge or bottom. 2 In so constructing the case as to have
it open or capable of being opened for the purpose of receiving & adjusting the
internal machinery of the lock on its upper edge & not on either side or the low
er edge. 3 In so locating the key hole, that when the key is introduced its bit
may pass in whole or in part below the bottom of the case 4 In using the edge
or bottom of the case for the [illegible] the lock by cutting it to correspond in whole
or in part to the form of the key 5 In combining a bolt moved by the action
of the key on a notch or between cheeks on the under side of its shank with tumblers
falling into slits or notches in the bit of the key. 6 In so locating the tumblers
or of the tumblers that it may fall into the same notch or recess in the bit of the
key whether the key be introduced from one side or the other of the door 7 In
combining the method as herein described of hanging the tumblers viz by attach
ing them to the bolt with the method as herein described of giving [illegible]
[illegible] security to the lock viz by having several tumblers falling into correspon
ding notches or slits of different depths in the bit of the key 8 In placing the
[illegible] behind the key hole [illegible] And whereas the foregoing eight enumer
ated particulars are all applicable as herein described to the Mortise lock we
[illegible] claim them all in their application to Mortise locks And whereas
with the exception of the first and second they are equally applicable and in the
same manner to other locks we do therefore claim them all with the exception
of the first & second in their application to other locks. Witness our signatures
this 10th Dec. 1835

Witnesses
[illegible] Underford
[illegible]

[illegible] Blake
Eli W. Blake

Patented Feb 6, 1836

Drawing

2045 [illegible]